(12) United States Patent
Eide et al.

(10) Patent No.: US 8,355,484 B2
(45) Date of Patent: Jan. 15, 2013

(54) METHODS AND APPARATUS FOR MASKING LATENCY IN TEXT-TO-SPEECH SYSTEMS

(75) Inventors: Ellen Marie Eide, Tarrytown, NY (US); Wael Mohamed Hamza, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 1280 days.

(21) Appl. No.: 11/620,842

(22) Filed: Jan. 8, 2007

(65) Prior Publication Data

US 2008/0167874 A1  Jul. 10, 2008

(51) Int. Cl.
*H04M 1/64* (2006.01)
(52) U.S. Cl. ........................ 379/76; 379/88.14
(58) Field of Classification Search .............. 379/68, 379/71, 72, 76
See application file for complete search history.

(56) References Cited

U.S. PATENT DOCUMENTS

| | | | |
|---|---|---|---|
| 5,737,393 A * | 4/1998 | Wolf | 379/88.13 |
| 6,266,399 B1 * | 7/2001 | Weller et al. | 379/88.19 |
| 6,345,250 B1 * | 2/2002 | Martin | 704/260 |
| 6,546,097 B1 * | 4/2003 | Peltz | 379/265.07 |
| 6,856,673 B1 * | 2/2005 | Banks et al. | 379/114.13 |
| 6,925,166 B1 * | 8/2005 | Chan | 379/265.02 |
| 7,143,148 B1 * | 11/2006 | Hickman et al. | 709/218 |
| 7,215,745 B2 * | 5/2007 | Peters | 379/88.23 |
| 7,433,822 B2 * | 10/2008 | Buchholz et al. | 704/270 |
| 7,555,115 B2 * | 6/2009 | Button | 379/265.09 |
| 7,792,973 B2 * | 9/2010 | Gallant et al. | 709/228 |
| 2005/0273338 A1 * | 12/2005 | Aaron et al. | 704/267 |
| 2006/0122840 A1 * | 6/2006 | Anderson et al. | 704/275 |
| 2007/0041519 A1 * | 2/2007 | Erhart et al. | 379/88.01 |
| 2008/0095345 A1 * | 4/2008 | Sharma et al. | 379/201.01 |
| 2010/0248786 A1 * | 9/2010 | Charriere | 455/563 |

* cited by examiner

*Primary Examiner* — Olisa Anwah
(74) *Attorney, Agent, or Firm* — Wolf, Greenfield & Sacks, P.C.

(57) ABSTRACT

A technique for masking latency in an automatic dialog system is provided. A communication is received from a user at the automatic dialog system. The communication is processed in the automatic dialog system to provide a response. At least one transitional message is provided to the user from the automatic dialog system while processing the communication. A response is provided to the user from the automatic dialog system in accordance with the received communication from the user.

17 Claims, 3 Drawing Sheets

METHODS AND APPARATUS FOR MASKING LATENCY IN TEXT-TO-SPEECH SYSTEMS

FIELD OF THE INVENTION

The present invention relates to automatic dialog systems, and more specifically, to methods and apparatus for masking latency in an automatic dialog system.

BACKGROUND OF THE INVENTION

In telephony applications, text-to-speech (TTS) systems may be utilized in the production of speech output as part of an automatic dialog system. Typically during a call session, automatic dialog systems first transcribe the words communicated by a caller through an automatic speech recognition (ASR) engine. A natural language understanding (NLU) unit in communication with the speech recognition engine is used to uncover the meanings of the caller's words. These meanings may then be interpreted to determine requested information, which may be retrieved from a database by a dialog manager. The retrieved information is passed to a natural language generation (NLG) block, which forms a sentence in response to the caller. The sentence is then output, or spoken, to the caller through a TTS speech synthesis system.

A TTS system may be utilized in many current real world applications as a part of an automatic dialog system. For example, a caller to an air travel system may communicate with a TTS system to receive air travel information, such as reservations, confirmations, schedules, etc., in the form of TTS generated speech.

The information passed from the NLG to the TTS speech synthesis system is fed in a time-critical fashion. Unfortunately, the output incurs a compounded latency comprising the processing latencies of the ASR, NLU and NLG processors. Delays between the end of the caller's statement and the output, or spoken reply to the caller, may lead to confusion or frustration on the part of the caller.

Typically, delays or latencies are masked by playing "earcons", such as, for example, music. Such earcons inform the caller that the system is processing. However, the caller may find the earcons annoying or unnatural.

Therefore, it is desirable for an automatic dialog system to act similar to a human speaker by masking latency in a more natural manner that does not confuse, frustrate or annoy the caller.

SUMMARY OF THE INVENTION

The present invention provides techniques for masking latency in an automatic dialog system in a more natural manner by using paralinguistic events or fixed phrases.

For example, in one aspect of the invention, a technique for masking latency in an automatic dialog system is provided. A communication is received from a user at the automatic dialog system. The communication is processed in the automatic dialog system to provide a response. At least one transitional message is provided to the user from the automatic dialog system while processing the communication. A response is provided to the user from the automatic dialog system in accordance with the received communication from the user.

In additional embodiments of the present invention, an automatic speech recognition engine of the automatic dialog system may transcribe words in the communication from the user. The meanings of the words may be determined through a natural language understanding unit in communication with the automatic speech recognition engine in the automatic dialog system. Requested information may be retrieved in accordance with the meaning of the words from a database in communication with the natural language understanding unit in the automatic dialog system. The requested information may be sent from the database to the text-to-speech system. The response may be created in a natural language generator of the text-to-speech system. The response may be conveyed to the user through a speech synthesis system of the text-to-speech system, in communication with the natural language generator.

In a further embodiment of the present invention, in providing the transitional message, a filler generator may select a random message from a database. The random message may be conveyed to the user through a speech synthesis system of the text-to-speech system. Transitional messages may be provided to the user until the response is ready to be provided to the user. In addition, the transitional messages may comprise at least one of a paralinguistic event and a phrase.

In an additional aspect of the present invention, an automatic dialog system for producing speech output is provided. The automatic dialog system comprises a speech synthesis system that provides at least one transitional message to the user while processing a received communication from the user. The speech synthesis further provides at least one response to the user in accordance with the received communication from the user.

In an additional embodiment of the present invention, the automatic dialog system may further comprise an automatic speech recognition engine, a natural language understanding unit, a dialog manager, a natural language generator and a filler generator.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for masking latency in an automatic dialog system that is accrued through processing a response to a user's speech with the use of a filler generator capable of outputting paralinguistic events and fixed phrases.

Figure 1:
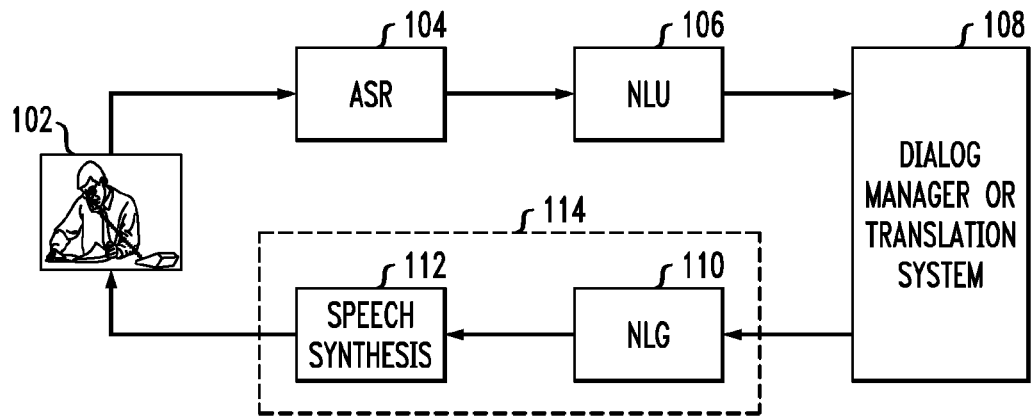
FIG. 1 is a detailed block diagram illustrating a text-to-speech system utilized in an automatic dialog system.

Referring initially to FIG. 1, a detailed block diagram illustrates a TTS system utilized in an automatic dialog system. A caller 102 initiates communication with the automatic dialog system, through a spoken message or request. An ASR engine 104 receives the sounds sent by caller 102 and associates them with words, thereby recognizing the speech of caller 102. The words are sent from ASR engine 104 to an NLU unit 106, which determines the meanings behind the words of caller 102. These meanings are used to determine what information is desired by caller 102. A dialog manager 108 in communication with NLU unit 106 retrieves the information requested by caller 102 from a database. Dialog manager 108 may also be implemented as a translation system.

The retrieved information is sent from dialog manager 108 to an NLG block 110, which forms a message in response to communication from caller 102, having the requested information. Once the sentence is formed, a speech synthesis system 112, plays or outputs the sentence to the caller with the requested information. NLG block 110 and speech synthesis system 112 may be considered a TTS system 114 of the automatic dialog system. While generating a response to caller 102, a latency results that is equal to the sum of the processing latencies of ASR engine 104, NLU unit 106 and NLG block 110.

Figure 2:
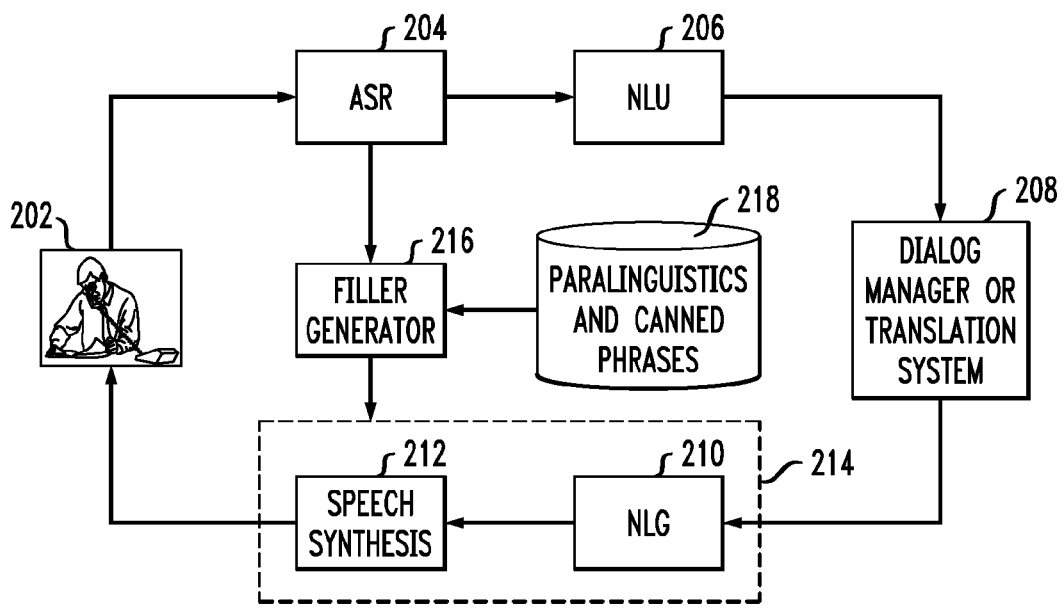
FIG. 2 is a detailed block diagram illustrating a text-to-speech system utilized in an automatic dialog system, according to an embodiment of the present invention.

Referring now to FIG. 2, a detailed block diagram illustrates a TTS system utilized in an automatic dialog system, according to an embodiment of the present invention. A caller 202 initiates communication with the automatic dialog system, through a spoken message or request. An ASR engine 204 receives the sounds sent by caller 202 and associates them with words, thereby recognizing the speech of caller 202. The words are sent from ASR engine 204 to an NLU unit 206, which determines the meanings behind the words of caller 202. These meanings are used to determine what information is desired by caller 202. A dialog manager 208 in communication with NLU unit 206 retrieves the information requested by caller 202 from a database. Dialog manager 208 may also be implemented as a translation system. The retrieved information is sent from dialog manager 208 to an NLG block 210, which forms a message in response to communication from caller 202, having the requested information.

As described above, as ASR engine 204, NLU unit 206 and NLG block 110 are each processing, a latency results that is equal to the sum of the processing latencies of ASR engine 204, NLU unit 206 and NLG block 210. To mask the resulting latency, ASR engine 204 first signals a filler generator 216 when caller 202 has finished speaking. Filler generator 216 selects a paralinguistic event or canned/fixed phrase from database 218. A speech synthesis system 212 of a TTS system 214 may immediately output or play the paralinguistic event or canned phrase from database 218, or filler generator 216 may delay the output by a few milliseconds before sending the paralinguistic event or canned phrase to speech synthesis system 212. Filler generator 216 may repeat selecting additional paralinguistic events or canned phrases from database 218 to be output by speech synthesis system 212 until NLG block 210 completes the formation of a response. Once NLG block 210 completes the formation of a response to caller 202, filler generator 216 stops selecting paralinguistic events and canned phrases to be output, and speech synthesis system 212 plays or outputs the response formed by NLG block 210 to caller 202.

The paralinguistic events or canned phrases may be prerecorded into database 218. The paralinguistic events may be selected randomly and may consist of coughs, breaths, and filled pauses such as, "uh," "um," and "hmmm." Similarly, fixed phrases such as "well . . . " or "let's see . . . " may also be prerecorded into database 200.

Figure 3:
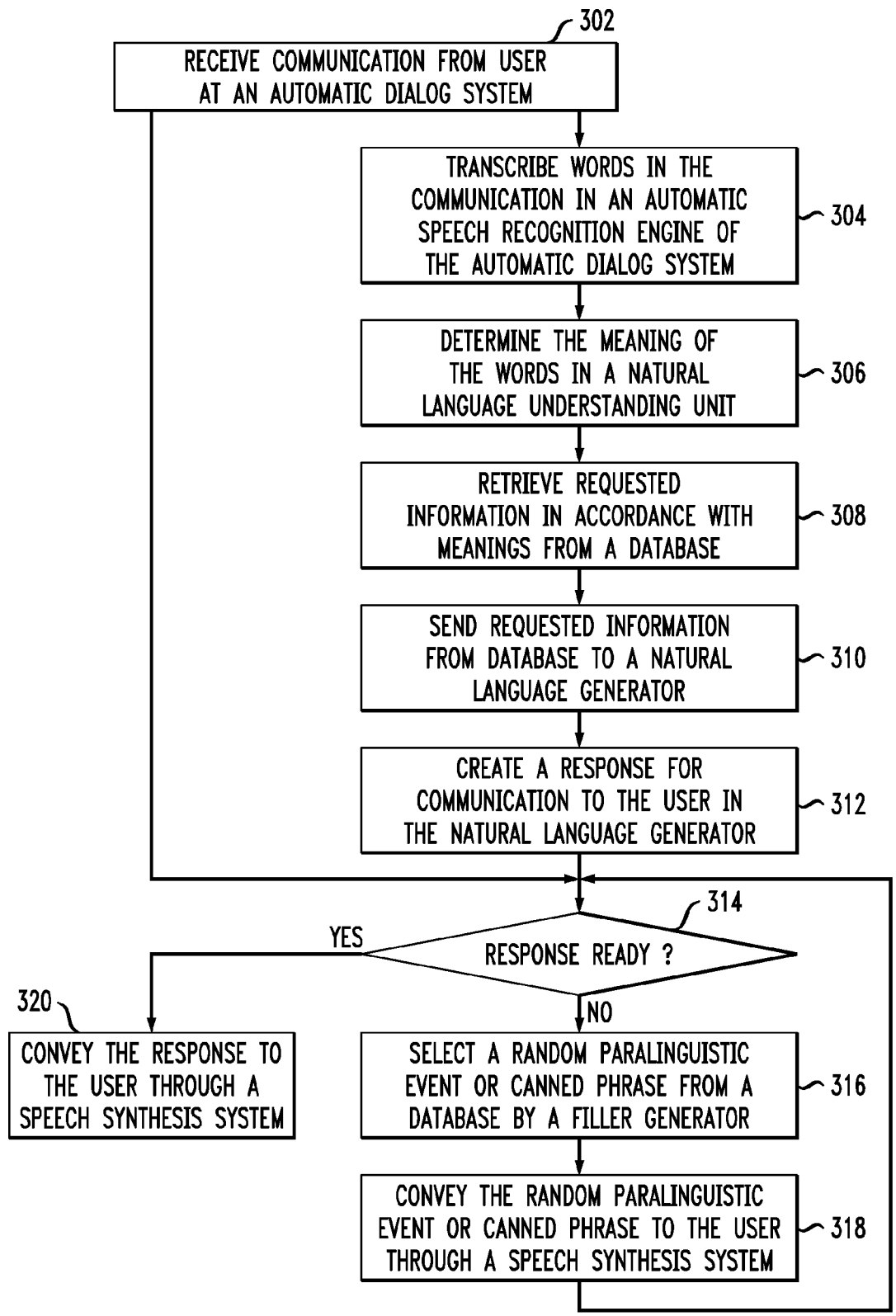
FIG. 3 is a flow diagram illustrating a latency masking methodology in an automatic dialog system, according to an embodiment of the present invention.

Referring now to FIG. 3, a flow diagram illustrates a latency masking methodology in an automatic dialog system, according to an embodiment of the present invention. The methodology begins in block 302, where an incoming communication is received from a user at an automatic dialog system. Typically a user of an automatic dialog system is a caller attempting to obtain specific information. In block 304, words in the communication from the user to the automatic dialog system are transcribed in an ASR engine of the automatic dialog system. In block 306, the meanings of these words are determined through an NLU unit in communication with the ASR engine in the automatic dialog system. In block 308, information is retrieved from a database in accordance with the meanings of the words. The information is typically that which is sought by the user or caller from the automatic dialog system. The dialog manager of the database is in communication with the NLU unit in the automatic dialog system. In block 310, the requested information is sent from the database to an NLG. In block 312, a response containing the requested information is created in the NLG for communication to the caller.

As the ASR engine, NLU unit, and NLG are processing, a latency results that is equal to a sum of the processing latencies of the ASR engine, NLU unit and NLG. In block 314, latency is determined by testing whether a response is ready after receiving a communication from a user in block 302. If a response is not ready, a filler generator selects a paralinguistic event or canned phrase from a database in block 316. In block 318, the random paralinguistic event or fixed phrase is conveyed to the user through a speech synthesis system. The methodology then returns to block 314 to determine whether the natural language generator has created the response. If it is determined in block 314 that the response from block 312 is ready, the response is conveyed to the user through the speech synthesis system in communication with the NLG, in block 320, terminating the methodology.

While the example has illustrated a telephone-based system, the invention is easily applied in other scenarios such as kiosks and Internet-based applications. Additional embodiments of the present invention may include different automatic dialog system and TTS system components and configurations. The invention may be implemented in any system in which it is desirable to adapt output speech in accordance with the context of the communication.

Figure 4:
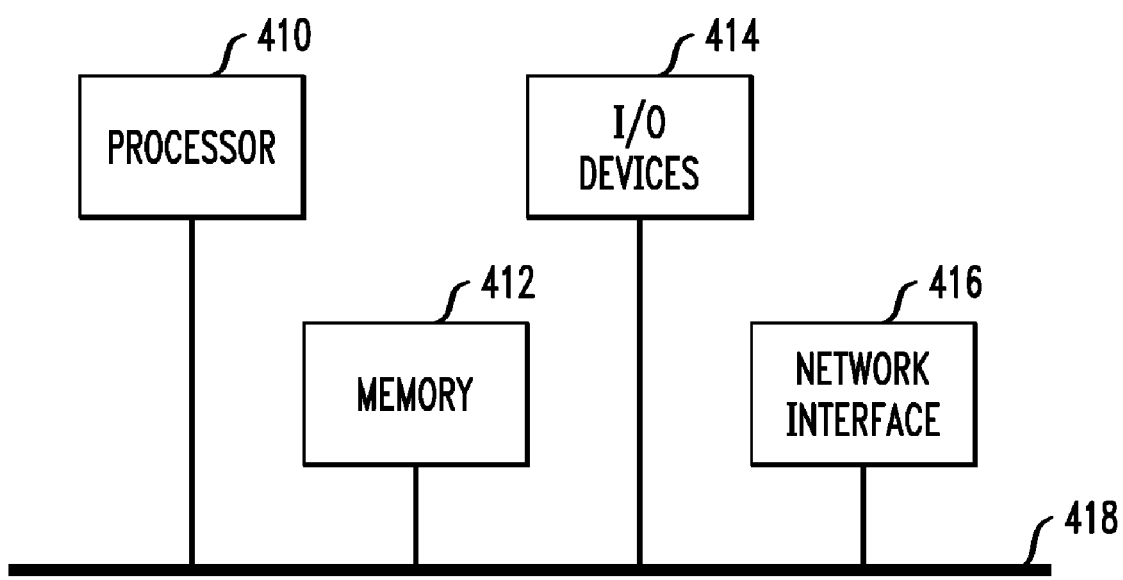
FIG. 4 is a block diagram illustrating a hardware implementation of a computing system in accordance with which one or more components/methodologies of the invention may be implemented, according to an embodiment of the present invention.

Referring now to FIG. 4, a block diagram illustrates an illustrative hardware implementation of a computing system in accordance with which one or more components/methodologies of the invention (e.g., components/methodologies described in the context of FIGS. 1-3) may be implemented, according to an embodiment of the present invention. For instance, such a computing system in FIG. 4 may implement the automatic dialog system and the executing program of FIGS. 1-3.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering speech or text into the processing unit, and/or one or more output devices for outputting speech associated with the processing unit. The user input speech and the TTS system annotated output speech may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automatic dialog system for producing speech output, comprising:
    a filler generator configured to select a transitional message in response to receiving a communication from a user; and
    a speech synthesis system configured to
        mask a latency associated with processing the communication by providing the transitional message to the user while processing the communication and until providing a response to the user, and
        provide the response to the user in accordance with the communication subsequent to providing the transitional message to the user,
    wherein
        the transitional message comprises a paralinguistic event and/or a phrase,
        providing the transitional message to the user comprises synthesizing the transitional message in the speech synthesis system,
        providing the response to the user comprises synthesizing the response in the speech synthesis system,
        the filler generator is further configured to select a plurality of transitional messages, and
        the speech synthesis system is further configured to provide each of the plurality of transitional messages to the user, while the automatic dialog system processes the communication and until the speech synthesis system provides the response to the user.

2. The automatic dialog system of claim 1, wherein the automatic dialog system further comprises:
    an automatic speech recognition engine configured to transcribe one or more words in the communication;
    a natural language understanding unit in communication with the automatic speech recognition engine for determining at least one meaning of the one or more words;
    a dialog manager in communication with the natural language understanding unit configured to retrieve requested information from a database in accordance with the at least one meaning of the one or more words;
    a natural language generator in communication with the dialog manager for creating the response for the speech synthesis system.

3. Apparatus for producing speech output in an automatic dialog system, comprising:
    a memory; and
    at least one processor coupled to the memory and operative to:
        receive a communication from a user at the automatic dialog system;
        process the communication in the automatic dialog system to provide a response;
        mask a latency associated with processing the communication by providing a transitional message to the user while processing the communication and until providing the response to the user; and
        subsequent to providing the transitional message to the user, provide the response to the user from the automatic dialog system in accordance with the communication,
    wherein
        the transitional message comprises a paralinguistic event and/or a phrase,
        providing the transitional message to the user comprises synthesizing the transitional message in a speech synthesis system, wherein providing the transitional message comprises providing each of a plurality of transitional messages,
        providing the response to the user comprises synthesizing the response in the speech synthesis system, and
        providing the transitional message comprises randomly selecting the transitional message from a database by a filler generator of the automatic dialog system.

4. The apparatus of claim 3, wherein the at least one processor is further operative to process the communication by:
    transcribing one or more words in the communication in an automatic speech recognition engine of the automatic dialog system;
    determining at least one meaning of the one or more words through a natural language understanding unit in communication with the automatic speech recognition engine;
    retrieving requested information in accordance with the at least one meaning of the one or more words from a database in communication with the natural language understanding unit; and
    sending the requested information from the database to a text-to-speech system of the automatic dialog system.

5. The apparatus of claim 3, wherein providing the response to the user further comprises creating the response in a natural language generator of a text-to-speech system of the automatic dialog system.

6. A method of producing speech output, comprising:
    with a filler generator, selecting a plurality of transitional messages in response to receiving a communication from a user;
    with a speech synthesis system, masking a latency associated with processing of the communication by an automatic dialog system, the masking comprising providing the plurality of transitional messages to the user while processing the communication and until providing a response to the user; and
    with the speech synthesis system and subsequent to providing the plurality of transitional messages to the user, providing the response to the user in accordance with the communication;
    wherein:

the plurality of transitional messages comprise a paralinguistic event and/or a phrase, providing the plurality of transitional messages to the user comprises synthesizing the plurality of transitional messages in the speech synthesis system, and providing the response to the user comprises synthesizing the response in the speech synthesis system.

7. The method of claim 6, wherein the processing of the communication comprises:

transcribing one or more words in the communication in an automatic speech recognition engine of the automatic dialog system;

determining at least one meaning of the one or more words through a natural language understanding unit in communication with the automatic speech recognition engine;

retrieving requested information in accordance with the at least one meaning of the one or more words from a database in communication with the natural language understanding unit; and sending the requested information from the database to a text-to-speech system of the automatic dialog system.

8. The method of claim 6, wherein providing the plurality of transitional messages comprises selecting, with the filler generator, the plurality of transitional messages from a database.

9. The method of claim 6, wherein providing the plurality of transitional messages comprises providing the plurality of transitional messages after a specified delay after receiving the communication.

10. The method of claim 6, wherein providing the response to the user further comprises creating the response in a natural language generator of a text-to-speech system of the automatic dialog system.

11. The method of claim 6, wherein each of the plurality of transitional messages includes a paralinguistic event corresponding to a cough, a breath, an utterance "uh," an utterance "um," and/or an utterance "hmmm."

12. An article of manufacture for producing speech output in an automatic dialog system, comprising a machine readable medium containing one or more instructions which when executed implement a method of:

with a filler generator, selecting a plurality of transitional messages in response to receiving a communication from a user;

with a speech synthesis system, masking a latency associated with processing of the communication by an automatic dialog system, the masking comprising providing the plurality of transitional messages to the user while processing the communication and until providing a response to the user; and with the speech synthesis system and subsequent to providing the plurality of transitional messages to the user, providing the response to the user in accordance with the communication;

wherein:

the plurality of transitional messages comprise a paralinguistic event and/or a phrase, providing the plurality of transitional messages to the user comprises synthesizing the plurality of transitional messages in the speech synthesis system, and providing the response to the user comprises synthesizing the response in the speech synthesis system.

13. The article of manufacture of claim 12, wherein the processing of the communication comprises:

transcribing one or more words in the communication in an automatic speech recognition engine of the automatic dialog system;

determining at least one meaning of the one or more words through a natural language understanding unit in communication with the automatic speech recognition engine;

retrieving requested information in accordance with the at least one meaning of the one or more words from a database in communication with the natural language understanding unit; and sending the requested information from the database to a text-to-speech system of the automatic dialog system.

14. The article of manufacture of claim 12, wherein providing the plurality of transitional messages comprises selecting, with the filler generator, the plurality of transitional messages from a database.

15. The article of manufacture of claim 12, wherein providing the plurality of transitional messages comprises providing the plurality of transitional messages after a specified delay after receiving the communication.

16. The article of manufacture of claim 12, wherein providing the response to the user further comprises creating the response in a natural language generator of a text-to-speech system of the automatic dialog system.

17. The article of manufacture of claim 12, wherein each of the plurality of transitional messages includes a paralinguistic event corresponding to a cough, a breath, an utterance "uh," an utterance "um," and/or an utterance "hmmm."

* * * * *